United States Patent Office 3,700,631
Patented Oct. 24, 1972

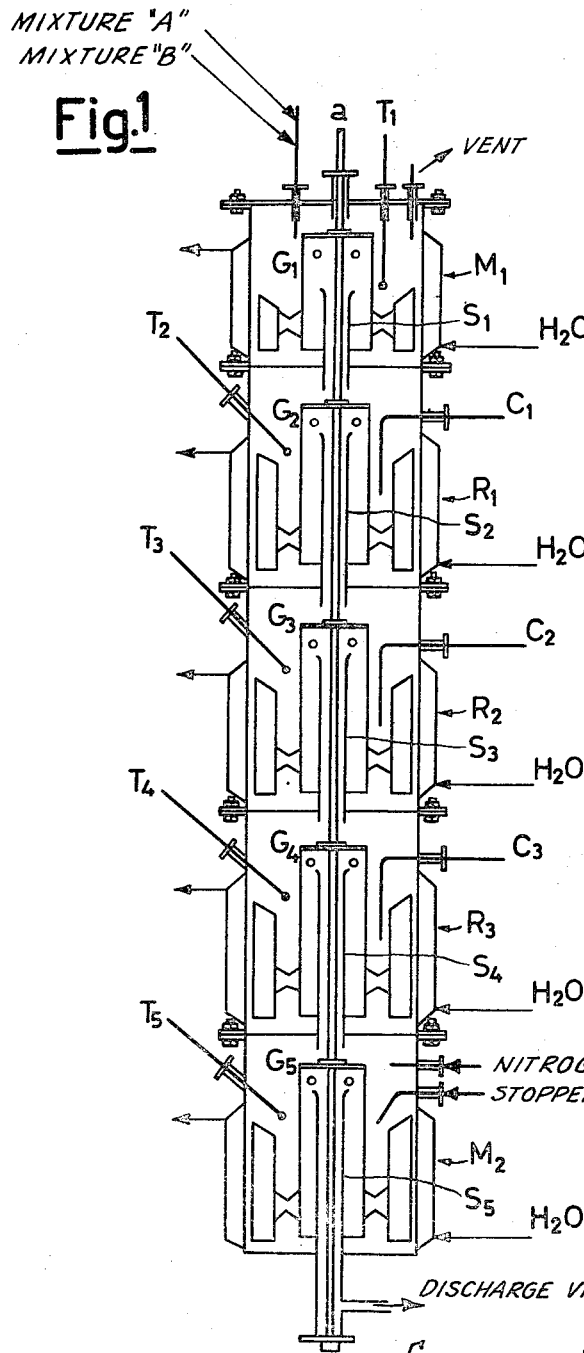

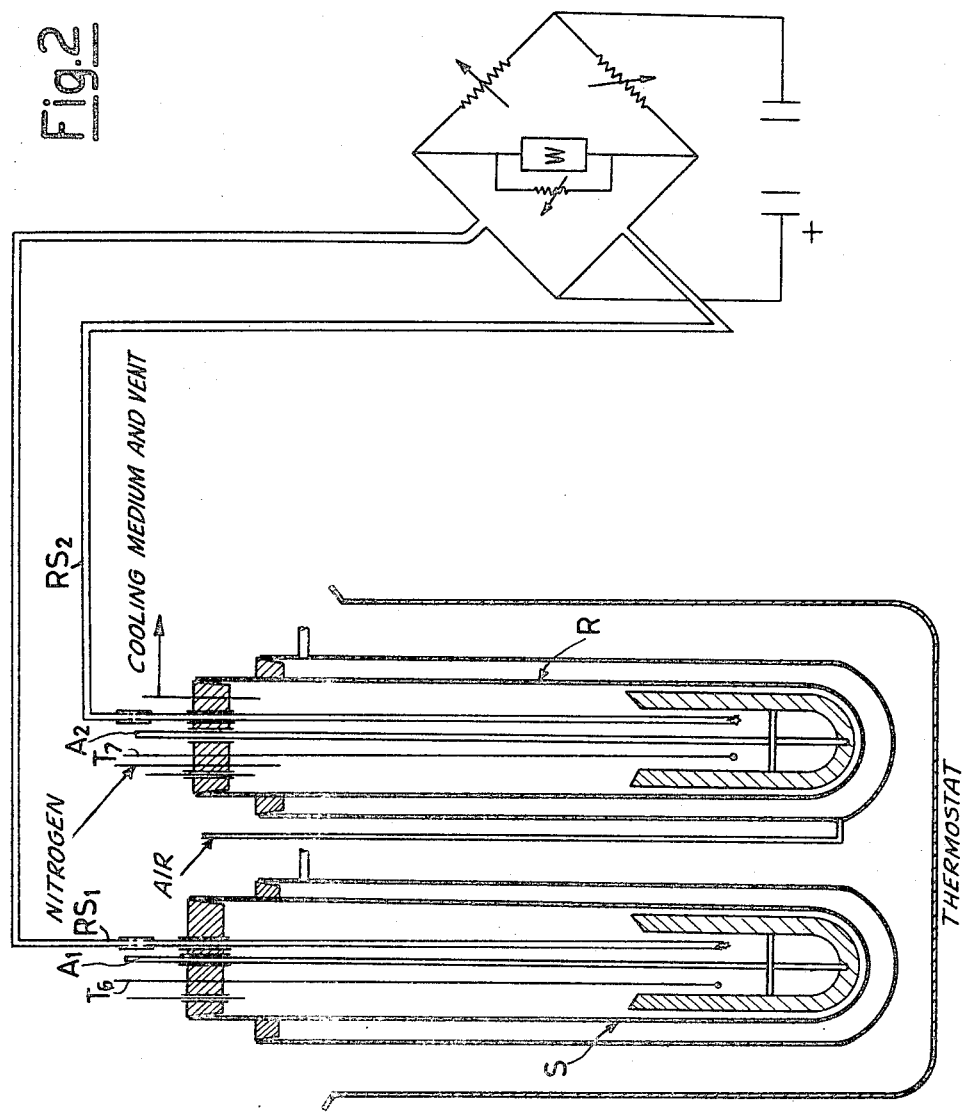

3,700,631
METHOD FOR THE PRODUCTION OF ACRYLO-
NITRILE POLYMERS AND COPOLYMERS
Francesco Siclari, Barlassina, Milan, Pietro Paolo Rossi, Garlasco, Pavia, and Seba Calgari and Roberto Jacuone, Cesano Maderno, Milan, Italy, assignors to Snia Viscosa Societa Nazionale Industria Applicazioni Viscosa S.p.A., Milan, Italy
Filed July 23, 1969, Ser. No. 844,072
Int. Cl. C08f 3/76, 15/22
U.S. Cl. 260—85.5          7 Claims

ABSTRACT OF THE DISCLOSURE

An improved method for polymerization or copolymerization of acrylonitrile is disclosed, of the kind in which the polymerization step is carried out within a polar organic solvent, wherein the catalyst system is of the so-called Redox type and comprises a peroxide, a reducing agent, a first metal, a second metal and a polymerization stopper which is soluble in the polar organic solvent. Also the metals or their compounds must be soluble in the organic polar solvent aforesaid. The metals are copper as a first metal and iron or cerium as the second metal. The stopper should also be a sequestering agent for metals. The preferred stoppers are some derivatives of ethylene diamino tetra acetic acid; a few of these derivatives, such as the nitrate, the chloride and the phosphate of EDTA have not yet been described heretofore in the technical literature. The advantage obtained with the method and the compounds of the invention is that acrylonitrile polymers and copolymers are obtained, which show improved physical properties and a highest whiteness rating.

---

This invention relates to an improved method for polymerizing acrylonitrile and its copolymers, in which acrylonitrile amounts to at least 85% by weight of the monomers. More particularly, this invention relates to improvements introduced in the method for the polymerization in solution in organic solvents, such as dimethylformamide, dimethyl-sulfoxide, dimethylacetamide and others.

Detailedly, the object of the present invention is to provide polymerization and copolymerization methods for acrylonitrile under particularly advantageous and favourable conditions for the production of compounds having a high quality, a regular degree of polymerization and which are susceptible of leading to the manufacture of products having a high whiteness rating and a high commercial value. More particularly, the polymers produced according to the invention are advantageously adapted to be converted into fibers and yarns for textile uses, films, sheets and other products having a high commercial value.

The technique of polymerization and copolymerization of acrylonitrile considers, among the most advantageous methods, the one which effects the polymerization process in solution in organic solvents, such as those suggested above, in the presence of appropriate catalysts, and under conditions which vary according to the particular process runs adopted. These conditions are concerned with reaction times and temperatures and differ as a function of the individual solvent used, the nature of the catalyst and other parameters.

It is obvious that there is a trend towards searching and using catalysts which are particularly active, especially at comparatively low temperatures, in order that the reaction may be promoted and completed within a satisfactorily short time, for obvious reasons of economical efficiency of the installations and improvement of the production in general.

Parameters having a particular interest are the initial and the final concentrations of the monomers in solution, as well as the conversion degree. These different parameters have a considerable influence on the average molecular weight and the uniformity of the degree of polymerization of the product.

An outstanding advantage of the polymerization in organic solvents lies in the fact that a viscous solution of a polymer is directly obtained, which can be directly treated for the manufacture of the final product. More particularly, a spinnable solution is obtainde, which is adapted to conversion for textile applications, in which the purity, the regularity of the degree of polymerization, the absence of gels and the whiteness rating are extremely important factors.

The regular evolution of the polymerization processes in solution requires that the several additives and adjuvants, especially the components of the catalyst system, are soluble, in turn in the solvent for the monomer or the monomers.

A few methods require that the reaction mass, once a determined conversion ratio has been attained, reaches a substantial density. According to other methods, by properly adjusting the concentration of the reactants, the formed polymer remains constantly under a condition of a complete solution and the reacted mass is more or less fluid.

Another conventionally known condition, which is extremely important in the polymerization methods concerned, is that the average molecular weight of the polymer is directly proportional to the concentration of the monomers in solution and also to other factors.

An important consequence of this known condition is thus that the average molecular weight of the polymer being formed is lowered as the reaction proceeds, since the amount of the monomers which are present in the solution tion becomes gradually smaller.

The conversions which are obtained with the different methods and the different conventional procedures, vary within a rather wide range. It is apparent, however, that, also in this connection, comparatively high conversion ratios are aimed at for obvious economical reasons.

At any rate, and independently of the higher or lower degree of conversion attained, at the end of the reaction, which is purposely discontinued once the desired conditions have been reached or can be even prevented from continuous due to the excessive condensation of the reaction mass, a more or less significant amount of monomers should be removed by distillation.

The latter stage, more particularly when it is carried out at the end of a polymerization run promoted by catalysts or particularly active catalyst systems, originates the serious drawback that, in the time which is required for removing in a practically total manner the unreacted monomers, the polymerization run unavoidably proceeds with the formation of polymeric fractions having a constantly decreasing molecular weight, which is due to the fact that the concentration of the monomers is lowered with a gradual trend until becoming virtually nil.

In the light of the foregoing, it is an object of the present invention to provide methods for the polymerization, or copolymerization of acrylonitrile in solution in organic solvents of the kind referred to above, which do not exhibit or exhibit to a limited extent only, the shortcomings re-called above and the limitations, also mentioned above, due to the application of the conventional technical teaching.

More specifically, it is an object of the present invention to provide an improved method for the polymerization or copolymerization of acrylonitrile, generally in association with appropriate comonomers, such as methyl-metacrylate, methyl acrylate, allylsulphates and others, involving the use of a particularly active and efficient catalyst system, such as to give rise to a regular evolution of the reaction until favourable values of the conversion and a satisfactory and uniform molecular weight are reached, and a further object of the invention is to provide means adapted to control the subsequent activity of the catalyst system for attainment of said molecular weights and degrees of conversion, so that, on completion of the stage of removal of the unreacted monomer fractions, the polymer may retain the most desirable features and properties as to molecular weight, clearness, absence of gels, solid particles and others for the subsequent conversion of said polymer into valuable industrial products such as fibers and yarns for textile use, films, sheets and others. Another object of the invention is to identify particularly favourable association of catalyst systems and agents controlling the activity thereof, adapted to obtain the effects and to achieve the objects indicated above, while, at the same time, preventing discolorations in the polymer and other detrimental effects liable to prejudice the quality of the end product.

Another object of the invention is to identify and employ particularly active and efficient catalyst systems which are adapted to ensure the regular progress of the polymerization or copolymerization run, within a satisfactorily short time, said catalyst systems being adapted, in turn, to be deactivated, to a virtually complete extent, by the means which control their activity in the stages and for the purposes to be specified hereinafter.

Another object of the invention is to identify and provide for systems and compounds which are adapted to impede the progress of the reaction, for the purposes to be specified hereinafter, and which are perfectly soluble in the organic solvents for the monomer, thus being capable of displaying, in an active and favourable manner, their inhibiting action in the desired stages and under the desired conditions.

Another object of the invention is to identify and provide compounds which in addition to preventing, in the desired stages and under the most desirable conditions, advantageously contribute towards preventing, the formation of undesirable discolorations in the finished product. This object is more particularly referred to the case of the employment of catalysts comprising, as their constituents, metal ions which, notoriously, show a tendency to cause undesirable discolorations of the kind referred to above.

Another object of the invention is to identify and provide reaction conditions for performing said process, such as to ensure the qualitative improvement of the product, more particularly at comparatively low temperatures, that is, at those temperatures which are the most advisable to the end of preventing or reducing yellow staining and other such phenomena.

According to the invention, the improvement essentially consists in promoting polymerization by employing a catalyst system of the oxidising-reducing type (i.e. a so-called Redox system) and including at least either an inorganic or organic peroxide, a reducing agent and at least one compound of a metal and preferably of a couple of metals, one of which is copper, and in controlling the reaction conditions and more particularly inhibiting the progress thereof until the expected degree of conversion and the desired molecular weights are attained, with the use of a chelating or sequestering agent for the metals which compose the catalyst system and which is, in turn, soluble in the polar organic solvent used for the polymerization.

The adherence to the conditions of solubility of the sequestering agent in the solvents indicated above has been conducive to technical problems whose solution is a feature of this invention.

It is known, in fact, that there are agents for stopping catalytically promoted reactions (the so called "stoppers") among which are the so-called chelating or sequestering agents, adapted to form complexes with the metals which are present and thus stop the actvitiy of the catalyst systems of which said metals are an essential or greatly influencing element. Among said stoppers or chelating agents, compounds are known which, however, exhibit the characteristic feature of a substantial insolubility in the organic solvents contemplated by the invention and which are a critical factor for the subject polymerization.

A typical and efficient stopper having a chelating or sequestering agent, is ethylene diamino tetra-actic acid (EDTA) which is employed as such and in the form of its sodium salt.

This stopper, however, is not soluble or is only poorly soluble in the considered organic polymerization solvents. Thus the addition of said stoppers to the solutions for polymerization of acrylonitrile gives rise to turbid suspensions whose filtration is difficult and which are such as to prejudice the spinning operation and the quality of the commercial end product.

It has been ascertained, in addition, that an addition of such stoppers to the reaction mass under a state of incomplete dissolution, would be unable efficiently to prevent the progress of the reaction, which is one of the objects of the invention.

According to said further feature of the invention, the stopper consists of a salt which is soluble in said organic solvents, more particularly a soluble salt derived from ethylene diamino tetra acetic acid (EDTA).

In the preferred embodiments of the invention, the process comprises the steps of promoting and continuing, until the desired conversion and molecular weight are attained, the polymerization or copolymerization of monomeric acrylonitrile, and preferably of a mixture of monomers in which acrylonitrile is the greatly predominant component, in solution in an organic polar solvent. As organic solvents, dimethylformamide, dimethylsulfoxide and dimethylacetamide are suggested. Also other organic polar solvents, known as solvents in polymerization or copolymerization processes of acrylonitrile in solution, can be used providing that the condition of substantial solubility of the stopper also in these solvents is adhered to. The reaction is promoted and ensured by an oxidising-reducing catalyst system consisting of either an organic or inorganic peroxide, such as hydrogen peroxide or persulphates, a reducing agent consisting of a sulphinic acid or ascorbic acid, or sucrose or other known copper-reducing agents, and preferably of p-chloro-benzene-sulphinic acid or its analogue and of a couple of metal salts, one metal being copper and the other preferably iron or cerium, the stoppage of polymerization being obtained according to the object of the invention, by the addition of a derivative of ethylene diamino tetra acetic acid which is soluble on the considered organic solvent, said derivative being selected from EDTA nitrate, sulphate, phosphate or chloride.

According to a subsidiary feature of the invention, the solution of the monomer or the copolymers in the polar organic solvent is brought to, and maintained at a pH between 1.5 and 5, preferably between 2.5 and 4.5.

The reaction can be promoted and continued at temperatures between 0° C. and 60° C., constant and appropriately changed during the reaction, and preferably between 25° C. and 55° C.

In addition, the concentration of the monomer or of the comonomers in the organic polar solvent can be between 10% and 60% by weight, with respect to the reaction masses, i.e. solvent plus monomer or monomers, and preferably between 25% and 40%.

In the preferred embodiment of the invention which is conducive to the production of acrylonitrile copolymers, these copolymers, in turn, comprise from 88% to 95% of acrylonitrile expressed in terms of monomer, the balance of comonomers consisting of methylmethacrylate, and methyl acrylate, or metha-acrylonitrile, and also of sulphonic acids and their derivatives, such as sodium metha allyl sulphate, sodium allyl sulphate or allyl sulphonic acid, styrene sulphonic acid and their salts, vinylpyridine, acrylamide and others, such comonomers being used individually or in different combinations.

As regards the catalyst system, the amount of oxidising agents can range from 0.01% to 0.3% by weight with respect to the reaction mass. If hydrogen peroxide is used, said amount preferably ranges between 0.02% and 0.08%.

The amount of reducing agents can range between 0.05% and 0.3% by weight, still with respect to the reaction mass, and preferably between 0.07% and 0.2%. More particularly, by employing, as the reducing agents, the p-chloro-benzene sulphinic acid and the p-toluene sulphinic acid, the preferred amounts, expressed in percentage by weight as above, range between 0.08% and 0.12%.

The amount of metal salts, expressed in terms of parts per million (p.p.m.) of metal with respect to the overall solution mass (additives not included) is for the copper salts between 0.04 and 6 p.p.m., and preferably between 0.06 p.p.m. and 4 p.pm As regards the second metal of the couple, its amount can range between 2 p.p.m. and 200 p.p.m., preferably between 3 and 20 p.p.m.

The amount of stopper is obviously proportional to, and at any rate a function of, the amount of the metal ions which are present and which the stopper is intended to eliminate or, more properly, to "sequester," thus displaying, in association with its main action of arresting polymerization, an efficient action for removing the metal ions from the produced polymer, the consequential advantageous, and characteristic subsidiary effect of the invention being the production of clear polymers which are such as to lead the production of compositions of matter, more particularly for textile applications, characterized by a high whiteness rating.

At any rate, such an amount can range between 0.001% and 1% by weight, with respect to the solvent-monomer solution and preferably between 0.01% and 0.1%.

In addition, it has been ascertained that an addition of a fraction of the sequestering agent can be effected at the start of polymerization or during progress thereof, so as possibly to control its course.

The process according to the invention can advantageously be carried out as a batch process, or, as an alternative, as a continuous run, with the use of appropriate implementations in which the desired stage sequence can be carried out, especially the polymerization stage proper (or copolymerization) and removal of the unreacted monomers, respectively, from a mass in which the reaction has been virtually discontinued.

The characteristic sequence of the improved method according to the invention, in which a polymerization stage promoted by a particularly active catalyst system is followed by a stoppage or, at least, a considerable reduction of the reaction velocity, and then by the removal by distillation of the unconverted fraction of the monomer(s), is carried out by adopting, as the instant of time of stoppage, the one at which the conversion degree has attained its most advantageous value.

This value can be selected within a wide range, on taking into account the several factors of economical advisability and efficiency of production and, on the other hand, on considering the condition, as previously mentioned and discussed, according to which the average molecular weight which can be obtained is decreased as the concentration of the monomer in the reaction mass is decreased.

As a rule, the stoppage of the reaction and subsequent removal of the converted monomers are carried out when the conversion has attained percentage values which are between 10% and 85%, and preferably between 15% and 75%.

A few exemplary embodiments of the improved process according to the invention follow, which are carried out both as batch processes and as continuous runs. In said examples, reference will be had to the accompanying diagrammatical drawings, wherein:

FIG. 1 is cross-sectional view of an apparatus used to carry out the improved process as a continuous run.

FIG. 2 shows, still diagrammatically and in cross-sectional view, a device used for carrying out reaction velocity tests, by employing different catalyst systems and different conditions, prior to and after the addition of the polymerization stopper, said device being adapted to follow a polymerization the whole of the polymerization.

EXAMPLE 1

This example shows a typical embodiment of the inventive method carried out as a batch process. This example is completed by the display, in tabular form, of the results of a set of tests which have been effected by varying the nature and the composition of the metal components of the catalyst systems, temperatures and other parameters.

A 20-liter stainless steel reactor, equipped with stirrer, thermometer, reflux condenser, nitrogen inlet tube and cooling jacket through which thermostatically controlled water is caused to flow, is loaded, at room temperatures, with 5.64 kgs. acrylonitrile, 0.36 kgs. methyl acrylate (AM) and 9 kgs. N,N'-dimethylformamide (DMF) having a specific conductivity of 0.2 microsiemens.

The concentration of the monomers in DMF is of 40%, the ratio of acrylonitrile to methyl acrylate is 94 to 6.

The pH of the admixture introduced in the reactor is adjusted to 2.7 by addition of 20 grs. of a 30% aqueous $HNO_3$. The mixture is kept during 20 minutes under nitrogen then the temperature is brought to 25° C. and there are added 20.7 grs. of 33% $H_2O_2$ (0.0455% of pure $H_2O_2$ in the mass) and 12 grs. of p-chlorobenzene sulphinic acid (0.08% in the mass). After 10 mins. there are added 30 mls. of a DMF solution of the metal catalyst which has been prepared as follows:

A 100-mls. flask is loaded with 1 gr. $FeSO_4.7H_2O$, adding then 1.25 mls. of a 1% solution of $CuSO_4.5H_2O$ in $H_2O_2$ and 1.2 mls. of 85% $H_3PO_4$, stirring and making up to 100 mls. Said addition corresponds to 4 p.p.m. of metallic Fe and to about 0.06 p.p.m. of metallic Cu in the mass.

Upon addition of the metallic catalyst, the temperature in the reactor rises to 28° C. and is maintained at this value by causing water, thermostatically controlled to a temperature of 25° C., to flow through the reactor jacket. After a 6-hour reaction, a viscous solution is obtained which contains 3.2 kgs. of an acrylonitrile-methyl acrylate copolymer (conversion of the charged monomers=53.4%).

The reaction is stopped by addition of 30 mls. of a 5% solution in DMF of the nitrate of the ethylene diamino tetra acetic acid, equivalent to 0.01 percent in the mass (solution).

The reaction stops immediately and a clear, absolutely colorless viscous solution is obtained. The nitrate of the ethylene diamino tetra acetic acid

$$[(HOOCCH_2)N.CH_2CH_2N(CH_2COOH)_2].HNO_3$$

has been prepared by admixing 73 grs. of EDTA with 189 grs. of 30% —$HNO_3$, adding 200 mls. water and heating to 80° C.–90° C., until complete dissolution has been obtained. By cooling the EDTA nitrate crystallizes and, as it is separated from the mother liquors, it is dissolved in distilled DMF and used as such without any further purifications (yields of the preparation 95%). The analysis of the product has given a contents of nitric acid of ~1.2 mols per mol of EDTA. The substance melts (dec.) at 122° C.–124° C. and is readily hydrolyzed by heating it in water.

The unreacted monomers are distilled off from the polymerization product.

The intrinsic viscosity $$V_i = \frac{\ln V_r}{c}$$

(as measured in a 0.5% solution of polymer is DMF) prior to distilling the monomers has been 1.69, after distillation of the monomers 1.70 and the concentration of solids was 20.5%.

In a polymerization carried out in a similar way and with the same implementation of the test reported above, no EDTAN has been added as a stopper prior to distilling the monomers.

A viscous solution having a reddish yellow colour has been obtained and the intrinsic viscosity was 1.67 whereas after the distillation it was 1.42.

The table reports the summary of the data of a few tests carried out in the same apparatus as described by employing DMF as the solvent of ACN–AM (ratio 94/6), the tests having been made by varying the nature and composition of the metal catalyst, temperatures, and other variables.

ring is continued for 15 additional minutes. The reaction product is clear and virtually colorless. A sample subjected to analysis contained 19.6% of polymer and 8.38% of unreacted monomers. The conversion was 70% with an output of 98 grs. of polymer per hour and per kg. of mixture. The intrinsic viscosity of the polymer prior to the distillation of the monomer was 1.66.

To the mass left in the reactor are added 3 kgs. of DMSO and the unreacted monomers are distilled off. A viscous solution is obtained, which contains 21% of polymer and about 0.15% of unreacted monomers, which is adapted to the production of fibers, films and other articles.

The intrinsic viscosity, after distillation of the monomers was 1.66.

This viscous solution has been spun in aqueous baths, and filaments having very desirable mechanical properties and a high whiteness rating have been obtained.

EXAMPLE 3

The apparatus described in Example 1 is charged with 5.2 kgs. of ACN, 0.8 kgs. metacrylonitrile and 9 kg. of DMF having a conductivity of 0.2 microsiemens. The temperature of the mixture is brought to 15° C. by cir-

| Test No. | Monomer concentration, percent | $H_2O_2$, percent | p-Chloro benzene sulphinic acid, percent | Metals P.p.m. | P.p.m. | Temp., °C. | pH | Monomers conversion, percent | EDTAN stopper, percent | Intr. visc. of the polym. obt. prior to the addit. of stopper | Duration, hours |
|---|---|---|---|---|---|---|---|---|---|---|---|
| 3 | 32.5 | 0.041 | 0.08 | $Hg^{++}$–14 | $Cu^{++}$–0.06 | 40 | 2.8 | 45 | 0.01 | 1.45 | 6 |
| 4 | 32.5 | 0.041 | 0.08 | $Pb^{++}$–12.5 | $Cu^{++}$–0.06 | 40 | 2.8 | 34.5 | 0.01 | 1.53 | 6 |
| 5 | 32.5 | 0.041 | 0.08 | $Ce^{+++}$–6.3 | $Cu^{++}$–0.06 | 25 | 2.7 | 46 | 0.01 | 1.6 | 6 |
| 6 | 32.5 | 0.041 | 0.08 | $Co^{++}$–10 | $Cu^{++}$–0.06 | 30 | 2.7 | 37.5 | 0.01 | 1.7 | 6 |
| 7 | 32.5 | 0.041 | 0.08 | $Fe^{++}$–4 | $Cu^{++}$–0.06 | 20 | 2.7 | 16 | 0.01 | 1.68 | 3 |
| 8 | 32.5 | 0.041 | 0.08 | $Fe^{++}$–4 | $Cu^{++}$–0.06 | 30 | 2.7 | 24 | 0.01 | 1.55 | 3 |
| 9 | 32.5 | 0.041 | 0.08 | $Fe^{++}$–4 | $Cu^{++}$–0.06 | 40 | 2.7 | 32.5 | 0.01 | 1.4 | 3 |
| 10 | 32.5 | 0.041 | 0.08 | $Fe^{++}$–4 | $Cu^{++}$–0.06 | 50 | 2.7 | 40 | 0.01 | 1.2 | 3 |
| 11 | 38 | 0.06 | 0.13 | $Fe^{++}$–8 | $Cu^{++}$–0.12 | 28 | 2.9 | 41.3 | 0.05 | 1.18 | 3 |

NOTE.—The viscosities ($V_i$) of the polymer after the addition of the stopper are not appreciably different from those obtained prior to the addition of said substance.

EXAMPLE 2

The reactor described in Example 1 is charged with 3.864 kgs. of distilled acrylonitrile, 0.294 kgs. distilled methyl acrylate, 0.042 kgs. sodium allyl sulphate crystallized from ethanol (double bonds 99.5%) and 10.8 kgs. distilled dimethylsulfoxide having a specific conductivity of 0.5 microsiemens. The concentration of the monomers is 28% and the ratio between the same is acrylonitrile: 92, methyl acrylate: 7 and sodium allyl sulphate: 1. A slight nitrogen stream is caused to flow through the reactor and the temperature of the mixture is brought to 50° C. by causing thermostatically controlled water to flow through the reactor jacket. There are added 20.7 grs. of hydrogen peroxide at 33% by weight (0.0455% of the mass) and 12 grs. of p-chlorobenzene sulphinic acid (0.08% of the mass). After 10 minutes with stirring under a nitrogen stream, there are added 60 mls. of an aqueous solution containing 1% of heptahydrous ferrous sulphate and 0.0125% of pentahydrous cupric sulphate. This addition corresponds to 8 p.p.m. of metallic Fe and 0.12 p.p.m. of metallic Cu (approx.) with respect to the mass. The pH of the mixture was about 4. The reactor is evacuated (100 mms. of Hg of residual vacuum) and the reaction temperature is maintained at 52° C.–54° C. by gradually decreasing the temperature of the cooling water which flows through the reactor jacket.

After a two-hour reaction, the vacuum is broken and the reaction is stopped by the addition of 120 mls. of a 5% solution of ethylene diamino tetra acetic acid sulphate (EDTAS) in DMSO (see Example 3 for the preparation), corresponding to 0.04 percent by weight of the mass. Stirculation of brine and there are added 30 grs. of 33%-$H_2O_2$ (0.066% in the mass) and 18 grs. of p-chloro benzene sulphinic acid (0.12% in the mass) after having adjusted the pH of the solution to 3 with 20 grs. of p-toluene sulphonic acid.

After 10-minute stirring at 15° C. under nitrogen there are added 60 mls. of the metallic catalyst mixture prepared in DMF according to Example 1.

After 2-hour reaction, the temperature is brought to 20° C. and is maintained at this value during 2 hours. After a 4-hour reaction the temperature is brought to 25° C. and this value is maintained during 2 additional hours. After 6 hours of reaction in total, there are added 3 grs. of ethylene diamino tetra acetic acid sulphate (0.02% in the mass), which has been prepared as follows: 500 grs. of $H_2O$ are admixed with 98 grs. of conc. $H_2SO_4$ (96%) and there are added 36.5 grs. of ethylene diamino tetra acetic acid. The mixture is heated to the boiling point until a complete dissolution is obtained. Upon cooling, a white solid substance crystallizes, which, upon drying weighed 99.5 grs. The polymerization mixture, which is of yellowish brown colour, becomes clear and colorless upon addition of EDTAS. A viscous solution is obtained, which contains: 3.4 kgs. of unreacted monomers and 2.6 kgs. of a polymer having an intrinsic viscosity of 1.35.

The conversion of the monomer to polymer was 43.3%. The unreacted monomers were directly distilled off in the polymerization reactor by adding, during distillation, 4 kgs. of DMF; on completion of the distillation, a viscous clear solution is obtained, which contains 21.5% of a polymer with less than 0.2% of undistilled monomers.

The intrinsic viscosity of the polymer was 1.37.

EXAMPLE 4

This example is a typical form of a continuous process. It has been carried out by using an apparatus such as shown in FIG. 1 consisting of a Pyrex glass column having five compartments $M_1$–$R_1$–$R_2$–$R_3$–$M_2$ which are individually jacketed and in whose interior there have been introduced: 5 cylindrical gilled rotors, perforated at the level of 2 cm. from the upper disc $G_1$ $G_2$ $G_3$ $G_4$ $G_5$ mounted on a single stirring shaft of stainless steel (a); 5 thermometers $T_1$ $T_2$ $T_3$ $T_4$ $T_5$, 5 tubes for passing the polymerization mass $S_1$ $S_2$ $S_3$ $S_4$ $S_5$ which have been adjusted so as to contain in $M_1$ 375 grs. and in $R_1$ $R_2$ $R_3$ 1,000 grs. of polymerization mass, 3 dipping tubes for sampling $C_1$ $C_2$ $C_3$, 2 tubes for feeding the nitrogen and the stopper solution, respectively into $M_2$, and a vent tube from $M_1$.

This apparatus is obviously completed by suitable containers for the several mixtures to be described later and for the solution of the polymerization stopper, by metering pumps for feeding the mixtures and solution in measured amounts, by means for removing and collecting the polymerized mass and by thermostatic devices by which the circulation pumps for the cooling water are controlled so as to maintain the reaction environment at the desired temperatures.

The ancillary means and devices are not shown in the drawing since they are conventionally known per se in the technical art.

There are loaded:

42.85 grs./hour of a mixture "A" of the following composition:

0.3 grs. of p-chloro-benzene sulphinic acid (0.08% in the mass).

0.75 grs. of a dimethyl formamide solution having the following composition on a weight basis: 1% $FeSO_4 \cdot 7H_2O$, 0.0125% of $CuSO_4 \cdot 5H_2O$ and about 2% of 85% $H_3PO_4$, corresponding to 4 p.p.m. of metallic Fe and 0.06 p.p.m. of metallic Cu in the mass.

41.76 grs. of distilled dimethylformamide.

0.04 grs. of 30% nitric acid.

332.15 grs./hour of a mixture "B" of the following composition:

113.34 grs. of distilled acrylonitrile.

8.53 grs. of distilled methyl acrylate.

209.45 grs. of distilled dimethylformamide.

0.3 grs. of 30% nitric acid.

0.525 grs. of 33% hydrogen peroxide (by volume, corresponding to 0.0455% in the mass). The pH of the mass is 2.8.

These mixtures are fed by means of metering pumps to the mixer $M_1$ and maintained at a temperature of 20° C. with stirring in an inert gas atmosphere.

The mass stays during 60 mins. in the mixer and then, by means of the outlet tube $S_1$, is transferred to the first reaction stage $R_1$, where it stays during 160 mins. at the temperature of 26° C. (The intrinsic viscosity of the produced polymer was 1.47, the conversion of the monomers was 16%.) Then the polymerized mass was transferred by means of the outlet tube $S_2$ to the second reaction stage $R_2$ to stay there during 160 mins. at a temperature of 28° C.

(The intrinsic viscosity of the polymer was 1.46 and the conversion of the monomers was 36%.) Then, through the outlet tube $S_3$ the mass is transferred to the third reaction stage $R_3$, to stay there during 160 mins. at a temperature of 30° C. (The intrinsic viscosity of the polymer was 1.47 and the conversion of the monomers was 53%.) Subsequently, through the discharge tube $S_4$ the polymerized mass is forwarded to the mixer $M_2$ and subjected to the reaction stoppage by means of a 1% solution in distilled dimethyl formamide of ethylene diamino tetra acetic nitrate, sent to $M_2$ by a metering pump at the rate of flow of 37.5 grs./hour, corresponding to 0.01% of EDTA.N in the mass. The polymerized and stopped clear mass is continuously discharged through the discharge tube $S_5$ and sent to the monomer distillation.

Upon distillation of the monomers, the intrinsic viscosity was 1.48.

To complete what has been said above, the results of a certain number of the most significant tests of the reaction velocities under different conditions are reported in tabular form. The tests have been carried out by using an apparatus such as shown in FIG. 2 and consisting of:

2 large test tubes of Pyrex glass (43 mm. diameter, 305 mms. height), jacketed and immersed in a thermostat, having anchor-shaped stirrers ($A_1$ and $A_2$), tubes for feeding and discharging nitrogen, conventional thermometers $t_6$ and $t_7$ and resistance thermometers connected by the circuits $RS_1$ and $RS_2$ to two sides of a Wheatstone bridge whose signals are recorded by a graphic recorder W.

The first test tube (R) is charged with 200 grs. of a mixture formed by 56 grs. of ACN, 4 grs. of methyl metacrylate and 140 grs. of DMF having a specific conductivity of 0.2 microsiemens. The second test tube (S) is charged with 200 grs. of pure DMF.

The assembly is ready for performing polymerization velocity tests as a function of the temperature and of the employed catalysts.

To achieve this object, the following procedure is adopted. The temperature of the assembly (test tubes and thermostats) is brought to the desired value. As the whole system is in equilibrium and the recorder shows no signal, the catalysts are introduced into the test tube R while simultaneously applying a vacuum in the jacket of the test tube. The temperature of R is increased and this increase is recorded during a preselected time by the graphic recorder (generally the instrument is calibrated so as to record temperature increases of 0.5° C., corresponding to a graphic deviation of about 40 mms.).

On completion of the readings, the vacuum in the test tube jacket (R) is broken and the temperature of the test tube is brought to the standard value (test tube S) by circulating cooled air through the jacket of R. At preselected time intervals, the subsequent velocity readings are taken by adopting the same technique.

The action of the polymerization stoppers is determined by carrying out velocity measurements under the different desired end conditions, before and after adding the stoppers. The polymerization velocity, expressed in grams of polymer produced in one minute, referred to 1,000 grs. of mixture, has been calculated by the following formula:

$$v_p = \frac{M.h.c}{17.3 \cdot 83.5 \cdot t}$$

wherein:

$v_p$ = polymerization velocity
M = molecular weight of ACN
h = height of the recordal peak (in mms.)
c = amount of heat (kilocalories per degree centigrade) to increase by 1° C. the temperature of R (which contains the mixture)
17.3 = polymerization heat of ACN (kilocalories per mol)
t = measuring time in minutes (in general the measurement time should be such that the temperature of R is increased by 0.5 to 0.8° C. as a maximum).
83.5 = height in millimeters of the peak corresponding to the raising of the temperature of R by 1° C.

According to this technique several tests have been carried out which are combined in the following table. In each test the characteristic features of the process have been varied as reported in the table. In the first three tests iron nitrate has been used and then, in the order given, iron acetate, phosphate and benzene sulphate.

Copper has been used in different forms such as nitrate, phosphate, etc.

TABLE B

| No. | Conc. of oxidising a wgt., percent wt. (a) | Conc. of red. agt., percent by wt. | Conc. monom., percent wt. | Metals P.p.m. Fe++ | Metals P.p.m. Cu++ | Temp., °C. | pH | Convers. monom., percent | Duration, hours | Stopper, percent (c) | Polymerization velocity, grams per minute Before adding stopper | Polymerization velocity, grams per minute After adding stopper |
|---|---|---|---|---|---|---|---|---|---|---|---|---|
| 1 | 0.2 | 0.3 | 35 | 200 | — | 30 | 2.2 | 38 | 5 | 0.5 | 0.4 | 0.04 |
| 2 | 0.2 | 0.15 | 35 | 200 | — | 30 | 2.3 | 44 | 5 | 0.5 | 0.41 | 0.038 |
| 3 | 0.15 | 0.1 | 30 | — | 4 | 25 | 3 | 78.5 | 15 | 0.01 | 0.25 | 0.016 |
| 4 | 0.25 | 0.1 | 25 | 4 | 0.06 | 5 | 4 | 48 | 5 | 0.01 | 0.45 | 0.05 |
| 5 | 0.2 | 0.2 | 30 | 4 | 0.06 | 35 | 3 | 45 | 5 | 0.01 | 0.42 | 0.045 |
| 6 | 0.15 | 0.08 | 35 | 8 | 4 | 25 | 3 | 50 | 2 | 0.05 | 1.45 | 0.05 |

(Test 1): a=lauroyl peroxide; b=sucrose; c=EDTAS.
(Test 2): b=1-ascorbic acid; a and c as in test 1.
(Test 3): a=lauroyl peroxide; b=p-toluene sulphinic acid; c=as in Test 1.
(Test 4): a=$C_6H_{11}SO_2OOCOCH_3$ (acetylcyclohexanesulphonyl peroxide); b=alpha-hydroxy-2-furane methane sulphinic acid (sodium salt of $C_5H_4O_4S$); c=ethylene diamino tetra acetic acid phosphate (EDTAP)
(Test 5): a=ammonium persulphate; b=cynnamyl-4-sulphinic acid c=ethylene diamino tetra acetic acid chloride (EDTACl).
(Test 6): a=ammonium sulphate; b=p-chloro benzene sulphinic acid; c=EDTAN.

As can be seen in the table, the action of the stoppers is a very strong one; as a matter of fact, the polymerization velocities, after the addition of a stopper, is reduced to a very large extent.

Searches have been made in the technical literature on ethylene diamino tetra acetic acid nitrate, chloride and phosphate and it seems that such salts have not been described heretofore, so that they should be regarded as novel compositions of matter.

What is claimed is:

1. A method for the production of acrylonitrile polymers, where the acrylonitrile amounts to at least 85% by weight of the monomers, which comprises:

effecting the reaction with the monomer or comonomers in solution in an organic polar solvent selected from the group consisting of dimethylformamide, dimethylacetamide, and dimethylsulfoxide, at a temperature between 0° C. and 60° C. and with a pH between 1.5 and 5, and in the presence of a catalytic system of the oxidizing and reducing type and comprising at least one oxidizing agent selected from the group consisting of organic and inorganic peroxides and persulphates, at least one reducing agent selected from the group consisting of sulphinic and ascorbic acids, sucrose, and their analogs, and two metallic compounds, both of which are salts soluble in said organic polar solvent, one of which is a copper salt and the other of which is selected from the group consisting of mercury, lead, iron and cerium salts, the amount of oxidizing agent being from 0.01% to 0.3% by weight of the reaction mass and the amount of reducing agent ranging from 0.05% to 0.3% by weight of the reaction mass, the amount of the copper salt being between 0.04 and 6 p.p.m. with respect to the solution mass, and the amount of the other metallic compound being between 2 p.p.m. and 200 p.p.m. with respect to the solution mass, controlling the reaction by adding a stopper which is soluble in said organic polar solvent and which develops a sequestering action toward the metal salts in the catalytic system, and which is selected from the group consisting of the nitrate, sulphate, phosphate, and chloride salts of ethylene diamine tetra acetic acid, and withdrawing the unconverted monomers from the reacted mass after the reaction has been stopped or effectively slowed down.

2. An improved method according to claim 1 wherein hydrogen peroxide is employed as the oxidizing agent in an amount between 0.02% and 0.08% by weight with respect to the reaction mass.

3. An improved method according to claim 1, wherein the reducing agent is selected from the group consisting of p-chlorobenzene sulphinic acid, and p-toluene sulphinic acid and is in an amount between 0.08% and 0.12% with respect to the reaction mass.

4. An improved method according to claim 1, wherein the stopping agent is partly present during polymerization.

5. An improved method according to claim 1, wherein the stoppage of the polymerization reaction is effected when the value of the conversion is between 10% and 85%.

6. A method according to claim 1 wherein the stopper ranges in amount between 0.001% and 1% by weight with respect to the monomer or comonomer solution.

7. A method according to claim 1, wherein copolymerization is effected by reacting acrylonitrile and a comonomer selected from the group consisting of methylmethacrylate and methyl acrylate in said solution and under the conditions and with the compounds recited in claim 1, and the acrylonitrile is at least 88% by weight of the mixture of comonomers at a monomer concentration between 10% and 60% with respect to the entire reaction mass.

References Cited

UNITED STATES PATENTS

| | | | |
|---|---|---|---|
| 3,060,157 | 10/1962 | Goodman et al. | 260—85.5 M |
| 3,091,602 | 5/1963 | Himes et al. | 260—88.7 C |
| 3,141,869 | 7/1964 | Dennstedt | 260—88.7 C |
| 3,165,500 | 1/1965 | Logemann et al. | 260—88.7 C |
| 3,193,537 | 7/1965 | Dinges et al. | 260—88.7 C |
| 3,200,100 | 8/1965 | Dennstedt | 260—88.7 C |
| 3,396,154 | 8/1968 | Chamberlin et al. | 260—85.5 |
| 3,418,300 | 12/1968 | Nakajima et al. | 260—85.5 |

HARRY WONG, JR., Primary Examiner

U.S. Cl. X.R.

260—30.8, 32.6, 79.3 M, 80.6, 88.7 R